(12) United States Patent
Nishihara et al.

(10) Patent No.: US 6,834,964 B2
(45) Date of Patent: Dec. 28, 2004

(54) LIQUID CRYSTAL PROJECTOR

(75) Inventors: Shizuo Nishihara, Kanagawa (JP); Yoshifumi Akaike, Kumamoto (JP); Michio Nagaya, Kagoshima (JP); Naoko Uno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/398,966

(22) PCT Filed: Aug. 12, 2002

(86) PCT No.: PCT/JP02/08222

§ 371 (c)(1),
(2), (4) Date: Sep. 25, 2003

(87) PCT Pub. No.: WO03/019273

PCT Pub. Date: Mar. 6, 2003

(65) Prior Publication Data

US 2004/0114249 A1 Jun. 17, 2004

(30) Foreign Application Priority Data

Aug. 27, 2001 (JP) .................................. 2001-255628

(51) Int. Cl.⁷ .................... G03B 21/00; G03B 21/18; G03B 21/22; G03B 21/26; G02F 1/1335
(52) U.S. Cl. ................... 353/52; 353/33; 353/55; 353/119; 353/81; 349/5; 349/7; 349/8; 349/58
(58) Field of Search .................... 353/31, 33, 52, 353/55, 81, 119; 349/58, 5, 6, 7, 8

(56) References Cited

U.S. PATENT DOCUMENTS 5,493,351 A * 2/1996 Hamagishi et al. ............ 353/84
5,721,602 A * 2/1998 Narayan et al. ............. 349/161
5,743,611 A * 4/1998 Yamaguchi et al. .......... 353/31
6,540,360 B2 * 4/2003 Furuhata et al. ............. 353/31
6,565,213 B1 * 5/2003 Yamaguchi et al. .......... 353/33
6,709,110 B2 * 3/2004 Domroese et al. ........... 353/33

FOREIGN PATENT DOCUMENTS

| EP | 1016894 A2 | 5/2001 | ......... G02F/1/1333 |
| JP | 2001-021989 A | 1/1989 | ......... G03B/21/00 |
| JP | 01-158480 A | 6/1989 | ......... G09F/9/00 |
| JP | 01-302387 A | 12/1989 | ......... G09F/9/00 |
| JP | 10-239774 A | 9/1998 | ......... G03B/21/16 |
| JP | 10-239774 | * 9/1998 | ......... G03B/21/16 |
| JP | 10-239783 A | 9/1998 | ......... G03B/33/12 |
| JP | 11-337919 A | 12/1999 | ......... G02F/1/1333 |
| JP | 2000-89364 | * 3/2000 | ......... G03B/21/16 |
| JP | 2000-089364 A | 3/2000 | ......... G03B/21/16 |
| JP | 2001-154264 A | 6/2001 | ......... G03B/21/00 |
| JP | 2001-195006 A | 7/2001 | ......... G09F/9/00 |
| JP | 2001-209122 A | 8/2001 | ......... G03B/21/14 |

* cited by examiner

Primary Examiner—Judy Nguyen
Assistant Examiner—Melissa J Koval
(74) Attorney, Agent, or Firm—Robert J. Depke; Holland & Knight LLP

(57) ABSTRACT

The present invention provides a liquid crystal projector including a plurality of liquid crystal panels, a prism for compositing the modulated plural color lights to generate a color image, top and bottom metal plates disposed above and below the prism, and an optical system for magnifying and projecting the generated color image, wherein the liquid crystal panels are directly adhered to metal hold plates, and the metal hold plates are fixed to the top and bottom metal plates such that the emergent surfaces of the liquid crystal panels face the incident surfaces of the prism. Further, a closed space is provided between the incident surfaces of the prism and the emergent surfaces of the liquid crystal panels so as to prevent air contaminants from effecting the performance of the device.

5 Claims, 9 Drawing Sheets

LIQUID CRYSTAL PROJECTOR

This application claims priority to International Application No. PCT/JP02/08222, filed Aug. 12, 2002, and Japanese Patent Application No. JP2001-255628, filed Aug. 27, 2001, each of which are incorporated herein by reference.

TECHNICAL FIELD

The present invention relates to a liquid crystal projector, in particular, to a liquid crystal projector which has liquid crystal panels fixed to a dichroic prism under improved fixation configuration.

BACKGROUND ART

Generally, a liquid crystal projector includes a plurality of liquid crystal panels for modulating red (R), green (G), and blue (B) lights respectively, a dichroic prism for compositing thus modulated R, G, and B lights to generate a color image, and an optical system such as a projection lens for magnifying and projecting thus generated color image.

In a liquid crystal projector of this kind, respective color lights modulated by a plurality of liquid crystal panels are composited by a dichroic prism. So as to align pixels of respective liquid crystal panels to superpose projected images generated by respective liquid crystal panels onto a screen with high accuracy, such a liquid crystal projector is required to have an adjustment mechanism along the upward and downward, leftward and rightward, and rotation direction. Also, an adjustment mechanism for focusing along the forward and backward, pitching, and yawing direction is necessary so as to accurately bring focal points of projected images onto a screen into focus. In case of an optical prism unit having such adjustment mechanisms united therein, it becomes difficult to reduce the adjustment mechanisms in size when the size of liquid crystal panels is smaller than is predetermined. The more adjustment mechanisms become accurate for fine adjustment, the larger the adjustment mechanisms become in size. Thus, even though liquid crystal panels themselves are reduced in size, it is difficult to reduce an optical prism unit itself and a liquid crystal projector itself in size in view of their configuration under the constraint in size of their adjustment mechanisms. There is proposed a liquid crystal projector which has liquid crystal panels directly adhered to be fixed to a dichroic prism, excluding above-described adjustment mechanisms for the purpose of miniaturization. However, in case defect is detected in a liquid crystal panel, it is difficult to exchange only the defective liquid crystal panel after adhering the liquid crystal panel to a dichroic prism. So, even though defect is detected in only one liquid crystal panel, a unit of dichroic prism including the defective liquid crystal panel as well as other non-defective liquid crystal panels has to be exchanged, which is not economic.

There is also proposed a liquid crystal projector which has a panel fixation frame fixed to a dichroic prism, and has liquid crystal panels fixed to the panel fixation frame, excluding adjustment mechanisms from an optical unit. In this case, the liquid crystal projector is provided with a space or an air gap between the emergent surfaces of the liquid crystal panels and the incident surfaces of a dichroic prism. In the air gap, polarizing plates of the emergent sides are also provided. Thus, there is raised a problem that dust, which is scattered by a cooling fan for cooling liquid crystal panels, may break into the air gap and stick to the polarizing plates and the liquid crystal panels. Dust which is larger than is predetermined against the pixel size has a bad influence on the quality of projected images. The smaller the liquid crystal panels become, the more the problem of dust becomes serious.

As a liquid crystal panel is miniaturized, the density of an incident light from a light source increases, which subsequently increases the operation temperature of the liquid crystal panel. Furthermore, as a liquid crystal projector is miniaturized, an optical prism unit is also required to be miniaturized. In this case, it is predicted that the operation temperature undesirably exceed the top temperature limit under which emergent-side polarizing plates and liquid crystal panels cannot operate, which problem should be definitely solved. In a liquid crystal projector, polarizing plates located at the emergent sides and liquid crystal panels absorb lights from light sources and generate heat. Such polarizing plates and liquid crystal panels are made of organic material, and it is required that the operation temperature thereof be suppressed under 70° C. in enhancing the credibility of the operation of a liquid crystal projector.

DISCLOSURE OF THE INVENTION

Accordingly, the present invention has an object to overcome the above-mentioned drawbacks of the prior art by providing a liquid crystal projector which has liquid crystal panels fixed to a prism under improved fixation configuration, which enables exchange of parts or elements easily, and has sufficient capability of radiating heat, and can also prevent sticking of dust.

The above object can be attained by providing a liquid crystal projector including a plurality of liquid crystal panels for modulating a plurality of color lights respectively, a prism for compositing thus modulated plural color lights to generate a color image, and an optical system for magnifying and projecting thus generated color image, wherein the liquid crystal panels are directly adhered to metal hold plates, and the metal hold plates are fixed to the prism such that the emergent surfaces of the liquid crystal panels face the incident surfaces of the prism. The liquid crystal panels preferably have glass sheets having thermal conductivity fixed to the incident surfaces thereof. Radiation fins are fixed to the prism with the metal hold plates and the glass sheets having thermal conductivity brought into contact with the fins. A closed space is provided between the incident surfaces of the prism and the emergent surfaces of the liquid crystal panels so as to prevent air flow, and at least polarizing plates are arranged in the closed space. The polarizing plates are arranged at the incident sides of the prism, and thermal conduction members for absorbing heat generated in the polarizing plates may be arranged in the closed space.

According to the liquid crystal projector of the present invention, the liquid crystal panels are directly adhered to metal hold plates, and the metal hold plates are fixed to the prism such that the emergent surfaces of the liquid crystal panels face the incident surfaces of the prism. By employing this configuration, an optical prism unit united with liquid crystal panels can be reduced in size, and can be exchanged easily when defect is detected in a liquid crystal panel. The liquid crystal panels, which are directly adhered to metal hold plates excellent in thermal conductivity, are excellent in heat radiation. Furthermore, the liquid crystal panels have glass sheets made of such as sapphire glass having thermal conductivity fixed to the incident surfaces thereof. Also, radiation fins are fixed to the prism with the metal hold plates and the glass sheets having thermal conductivity brought into contact with the fins. By employing this configuration, the liquid crystal panels can be efficiently cooled. In addition, a closed space or an air gap is provided between the incident surfaces of the prism and the emergent surfaces of the liquid crystal panels so as to prevent air flow, which can prevent dust from breaking into the air gap and sticking to the polarizing plates and the liquid crystal panels arranged therein.

These objects and other objects, features and advantages of the present invention will become more apparent from the following detailed description of the preferred embodiments of the present invention.

BEST MODE FOR CARRYING OUT THE INVENTION

The liquid crystal projector employing the present invention will further be described below concerning the best modes with reference to the accompanying drawings.

Figure 1:
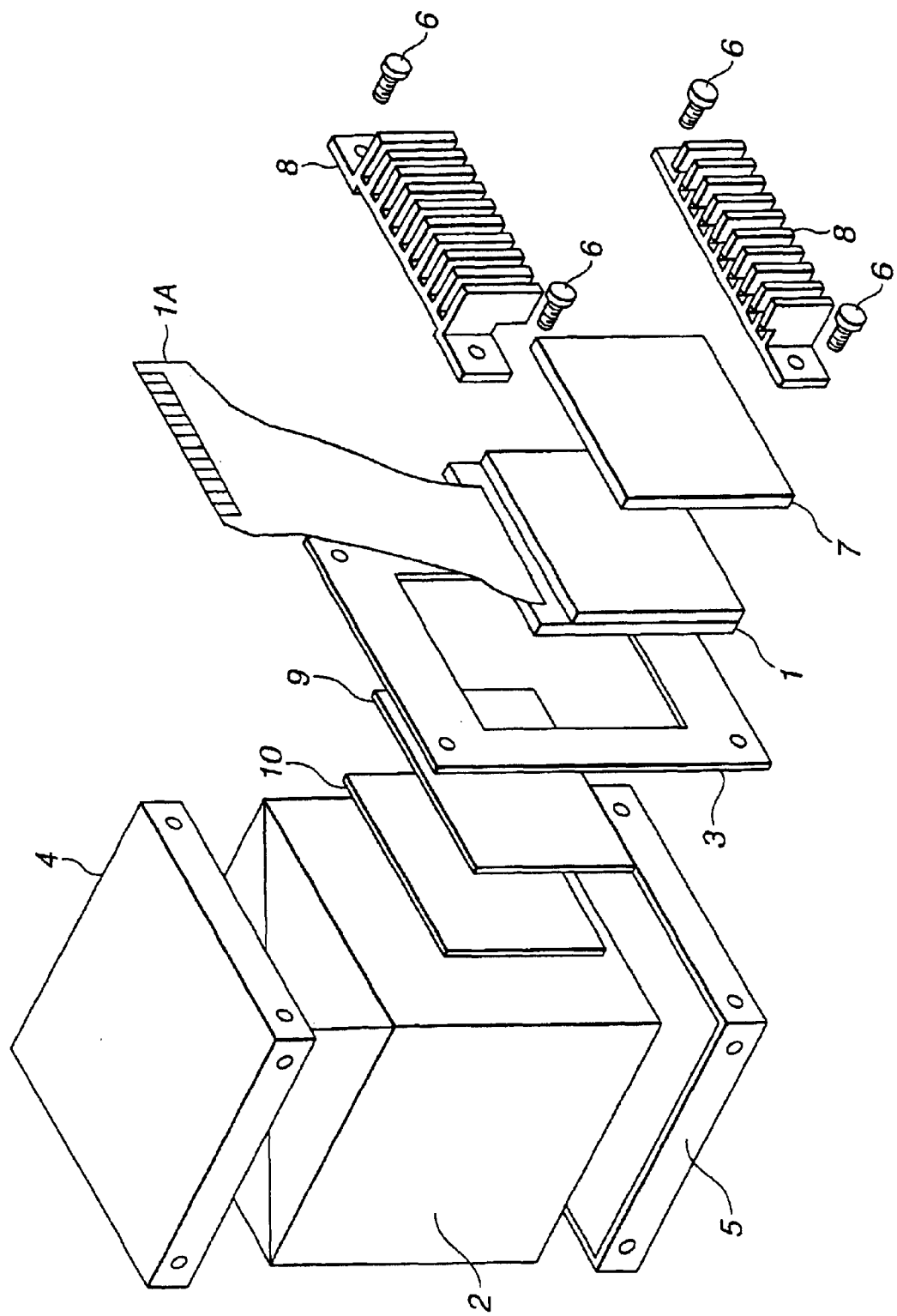
FIG. 1 shows an exploded view of an optical prism unit configuring the principal portion of the liquid crystal projector employing the present invention.

FIG. 1 shows an exploded view of an optical prism unit configuring the principal portion of the liquid crystal projector employing the present invention.

In the liquid crystal projector shown in FIG. 1, only one liquid crystal panel 1 is shown in the optical prism unit, which actually has a plurality of liquid crystal panels, so as to simplify the drawing for the convenience of simple comprehension. The liquid crystal panel 1 has two glass basal sheets joined together with liquid crystal enclosed therebetween, and a flat cable for external connection fixed thereto, as shown in FIG. 1.

The liquid crystal projector further has a dichroic prism 2 formed in the shape of a cube, which is sandwiched between an upper plate 4 and a lower plate 5. The upper plate 4 and the lower plate 5, which are made of metal material such as aluminum, conduct heat. The liquid crystal panel 1 is adhered to be fixed to a hold plate 3 which is also made of aluminum, etc. The hold plate 3 having the liquid crystal panel 1 adhered to be fixed thereto is fixed to the upper plate 4 and to the lower plate 5 using screws 6. Also, a pair of radiation fins 8 for cooling are fixed to the upper plate 4 and to the lower plate 5 using screws 6 with the hold plate 3 sandwiched therebetween.

A glass sheet 7 made of such as sapphire glass having high thermal conductivity is fixed to the incident surface of the liquid crystal panel 1. A polarizing plate 9 and a phase difference plate 10 are arranged in a space provided between the incident surface of the dichroic prism 2 and the emergent surface of the liquid crystal panel 1. The polarizing plate 9 and the phase difference plate 10 are adhered to be fixed to the emergent surface of the liquid crystal panel 1 using adhesive. The glass sheet 7 fixed to the incident surface of the liquid crystal panel 1 is brought into contact with the radiation fins 8 directly or indirectly via jointing material such as silicon grease having high thermal conductivity.

Thus, the liquid crystal projector employing the present invention has the liquid crystal panel 1 directly adhered to be fixed to the metal hold plate 3, which can radiate heat generated at the liquid crystal panel 1.

In a liquid crystal projector, which has its liquid crystal panel 1 enclosed in a protection frame made of plastic, the liquid crystal panel 1 is arranged via such protection frame. On the other hand, in the liquid crystal projector of the present. invention, the liquid crystal panel 1 itself is directly fixed to the metal hold plate 3 so as to improve cooling efficiency. Also, the liquid crystal panel 1 can be easily exchanged by loosening screws 6 and removing the hold plate 3 from the upper plate 4 and the lower plate 5, so the liquid crystal panel 1 can be exchanged easily. The glass sheet 7 is fixed to the incident surface of the liquid crystal panel 1. Thus, the outer surface of the liquid crystal panel 1 is protected, and cooling efficiency is improved. The metal hold plate 3 and the glass sheet 7 are physically brought into contact with the radiation fins 8, which improves cooling efficiently owing to thermal conduction.

Figure 2:
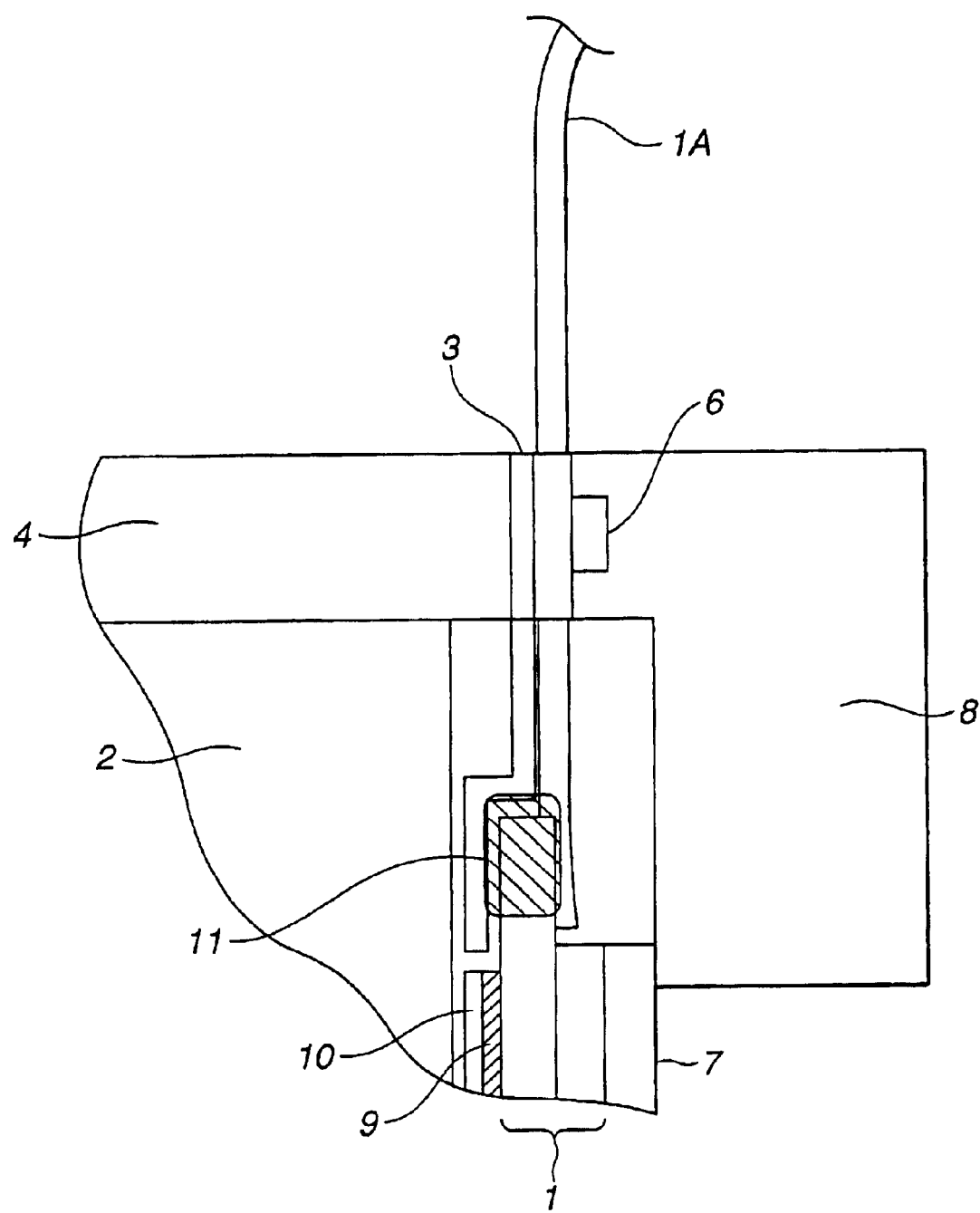
FIG. 2 shows an enlarged sectional view of the optical prism unit shown in FIG. 1.

FIG. 2 shows an enlarged sectional view of the optical prism unit shown in FIG. 1, which schematically shows fixing configuration of the liquid crystal panel 1.

The liquid crystal panel 1 is fixed to the metal hold plate 3 using adhesive 11, as shown in FIG. 2. The hold plate 3 is fixed to the upper plate 4 and to the lower plate 5 arranged at the side of the dichroic prism 2 using screws 6. At this time, the radiation fins 8 are fixed to the upper plate 4 and to the lower plate 5 with the hold plate 3 sandwiched therebetween. The glass sheet 7 made of such as sapphire glass is fixed to the incident surface of the liquid crystal panel 1. The glass sheet 7 having high thermal conductivity is brought into contact with the radiation fins 8 directly or indirectly via silicon grease etc., and heat generated at the liquid crystal panel 1 is conducted to the radiation fins 8. The polarizing plate 9 and the phase difference plate 10 are arranged in an air gap partitioned by the incident surface of the dichroic prism 2 and the emergent surface of the liquid crystal panel 1. In the embodiment, the polarizing plate 9 and the phase difference plate 10 are fixed to the emergent surface of the liquid crystal panel 1, while the present invention is not restricted to the embodiment, and the polarizing plate 9 and the phase difference plate 10 may be fixed to the incident surface of the dichroic prism 2.

Figure 3:
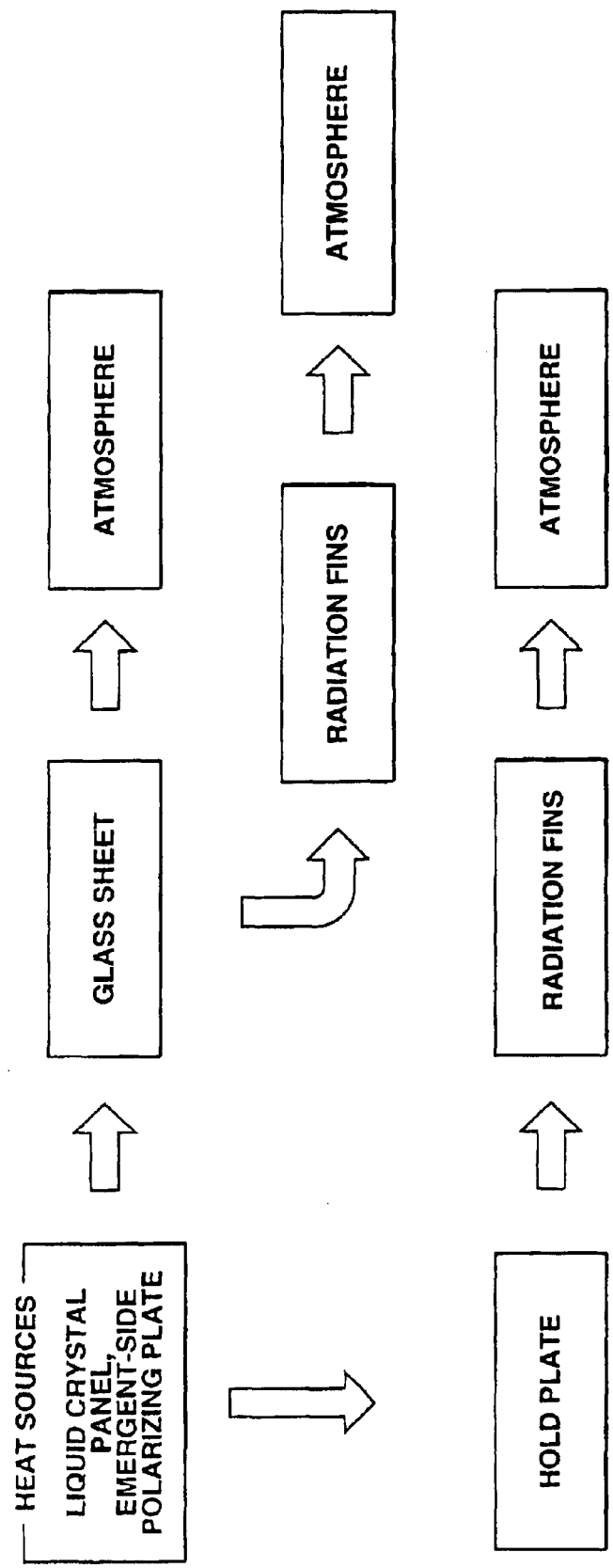
FIG. 3 shows a block diagram indicating radiation paths for radiating heat in the configuration of the liquid crystal projector employing the present invention.

FIG. 3 shows a block diagram indicating radiation paths for radiating heat in the configuration shown in FIG. 1 and FIG. 2.

Heat generated from the liquid crystal panel and the emergent-side polarizing plate being heat sources is radiated into the atmosphere through mainly three radiation paths, as shown in FIG. 3. That is, part of heat generated from the liquid crystal panel and the emergent-side polarizing plate is directly radiated into the atmosphere via the glass sheet made of sapphire glass etc. having high thermal conductivity. Part of heat conducted to the glass sheet is further conducted to the radiation fins, and thus conducted heat is radiated into the atmosphere. Other part of heat generated from the heat sources is conducted to the metal hold plate, and thus conducted heat is radiated into the atmosphere from the radiation fins. By thus radiating heat through the three radiation paths, the liquid crystal panel and the emergent-side polarizing plate can be efficiently cooled. By developing such a heat conduction and radiation configuration, heat generated from heat sources composed of the liquid crystal panel and the emergent-side polarizing plate is actively radiated into the atmosphere.

In the conventional liquid crystal projector, heat generated from a liquid crystal panel and an emergent-side polarizing plate is cooled at their surfaces by only air flows generated from a cooling fan.

On the other hand, according to the present invention, heat generated from the heat sources is conducted to outside rapidly through mainly three radiation paths, as shown in FIG. 3, which can efficiently cool the liquid crystal panel and the emergent-side polarizing plate. That is, cooling capability can be improved. Thus, in case an optical light of the same light quantity falls on the liquid crystal panel, even though rotational frequency of a cooling fan is decreased, temperature of the liquid crystal panel and the emergent-side polarizing plate can be suppressed by about the same extent as that of conventional configuration. When rotational frequency of a cooling fan is decreased, noise of the cooing fan can be suppressed.

Conventionally, the transparent glass sheet which is fixed to the incident surface of the liquid crystal panel is made of neoceram, and has its transmission surface coated with a reflection reducing film. Even though foreign matter such as dust sticks to the incident surface of the glass sheet, being defocused at the imaging focal point, actually, sticking of foreign matter such as dust can be ignored. In the present invention, by replacing the glass sheet, adopted for dust proofing, made of neoceram with that made of such as sapphire glass having high thermal conductivity, cooling function as well as dust proofing function can be obtained, which can reduce the cost.

Figure 4:
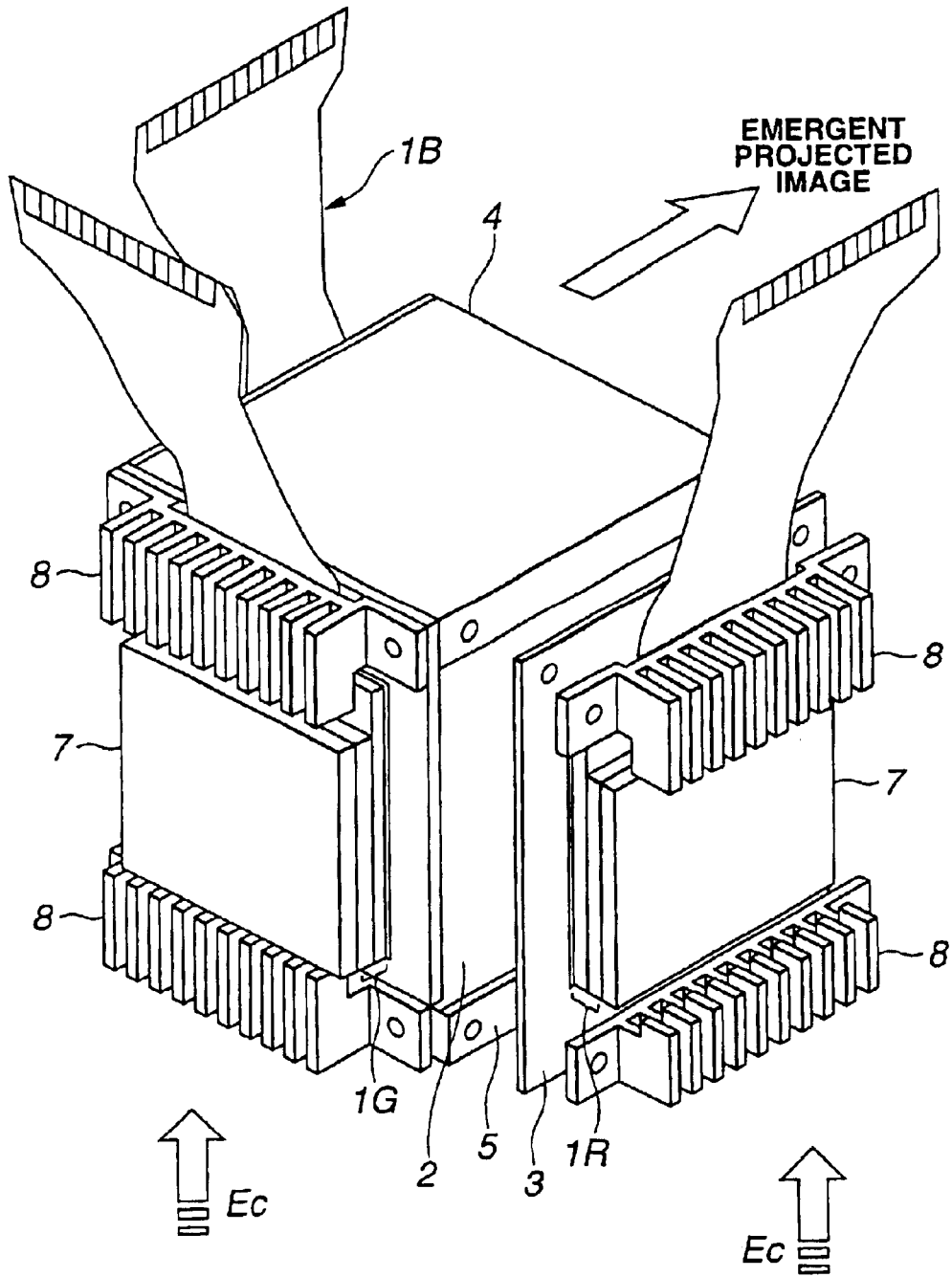
FIG. 4 shows a schematic perspective view of the assembled state of the optical prism unit of the liquid crystal projector employing the present invention.

FIG. 4 shows a schematic perspective view of the assembled state of the optical prism unit of the liquid crystal projector shown in FIG. 1.

The dichroic prism 2 formed approximately in the shape of a cube has the upper plate 4 made of such as aluminum fixed to the top thereof, and also has the lower plate 5 or base plate also made of such as aluminum fixed to the bottom thereof, as shown in FIG. 4. For a pair of the upper and lower plates 4 and 5, liquid crystal panels 1R, 1G, and 1B for R, G, and B lights are fixed. The liquid crystal panel 1R is fixed to the upper and lower plates 4 and 5 with the hold plate 3 adhered to be fixed thereto together with a pair of the upper and lower radiation fins 8 using screws. Similarly, the liquid crystal panel 1G is fixed to the adjacent incident surface of the dichroic prism 2 via the hold plate. Also, the liquid crystal panel 1B is fixed to the incident surface, opposite to the liquid crystal panel 1R, of the dichroic prism 2 via the hold plate. Thus, liquid crystal panels 1R, 1G, and 1B for R, G, and B lights are fixed to the three incident surfaces of the dichroic prism 2, and the residual one surface remains opened from which a projection image is emerging. A cooling fan, not shown, is arranged so that cooling air flows Ec pass through the radiation fins 8.

Figure 5:
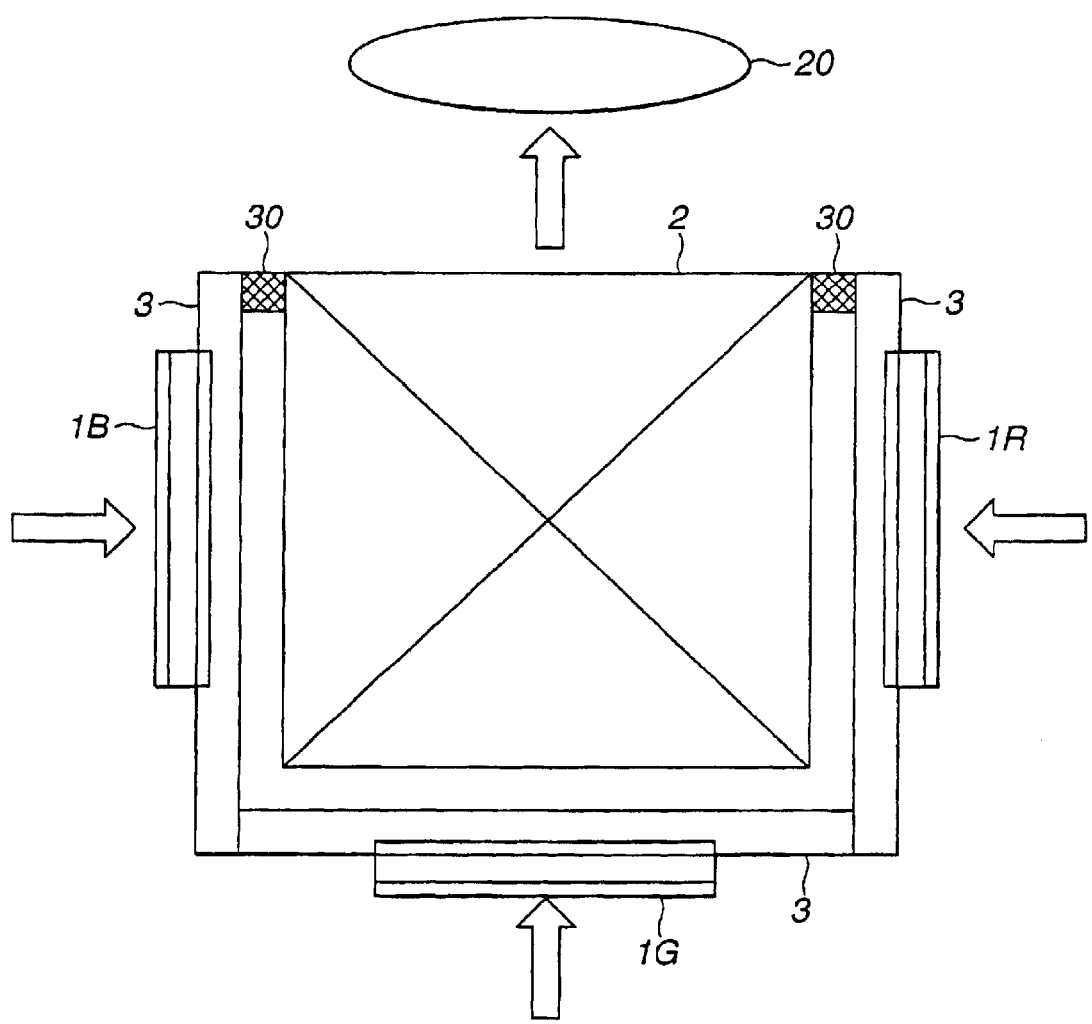
FIG. 5 shows a schematic plan view of the optical prism unit of the liquid crystal projector employing the present invention.

FIG. 5 shows a schematic plan view of the optical prism unit shown in FIG. 4.

The liquid crystal panels 1R, 1G, and 1B are fixed to the three sides of a square indicating the dichroic prism 2 via the hold plates 3, as shown in FIG. 5. A projection lens 20 being an optical system having a projection lens is so arranged as to face the residual one side of the square. There is provided a space between the dichroic prism 2 and the hold plate 3 having the liquid crystal panel 1R adhered to be fixed thereto, and the space is closed by a packing 30. Also, there is provided a space between the dichroic prism 2 and the hold plate 3 having the liquid crystal panel 1B adhered to be fixed thereto, and the space is closed by a packing 30. As has been described hereinbefore, the liquid crystal projector includes the multiple liquid crystal panels 1R, 1G, and 1B for modulating R, G, and B lights, the dichroic prism 2 for compositing thus modulated R, G, and B lights to generate a color image, and an optical system of the projection lens 20 for magnifying and projecting thus generated color image. The liquid crystal panels 1R, 1G, and 1B are directly adhered to be fixed to the metal hold plates 3, and the hold plates 3 are fixed to the dichroic prism 2 such that the emergent surfaces of the respective liquid crystal panels face the corresponding incident surfaces of the dichroic prism 2. The space (air gap) provided between the incident surfaces of the dichroic prism 2 and the emergent surfaces of the respective liquid crystal panels 1R, 1G, and 1B is closed by packings 30 so as to prevent air flow. Also, at least polarizing plates, not shown, are provided in the air gap.

As has been described above, the three incident surfaces of the dichroic prism 2 are enclosed by the liquid crystal panels 1R, 1G, and 1B, the hold plates 3, and adhesive. Also, the top and the bottom of the dichroic prism 2 are directly enclosed by the upper plate 4 and the lower plate 5. Around the emergent surface of the dichroic prism 2 which faces the projection lens 20, there are provided spaces at an end surface of the hold plate 3 having the liquid crystal panel 1R adhered to be fixed thereto and at an end surface of the hold plate 3 having the liquid crystal panel 1B adhered to be fixed thereto, and the spaces are closed by the packings 30. Thus, the respective incident surfaces of the dichroic prism 2 facing the respective liquid crystal panels 1R, 1G, and 1B are shielded from outside so as to prevent cooling air flows from entering. Thus, dust carried by cooling air flows Ec is prevented from sticking to the liquid crystal panels and the polarizing plates.

Figure 6:
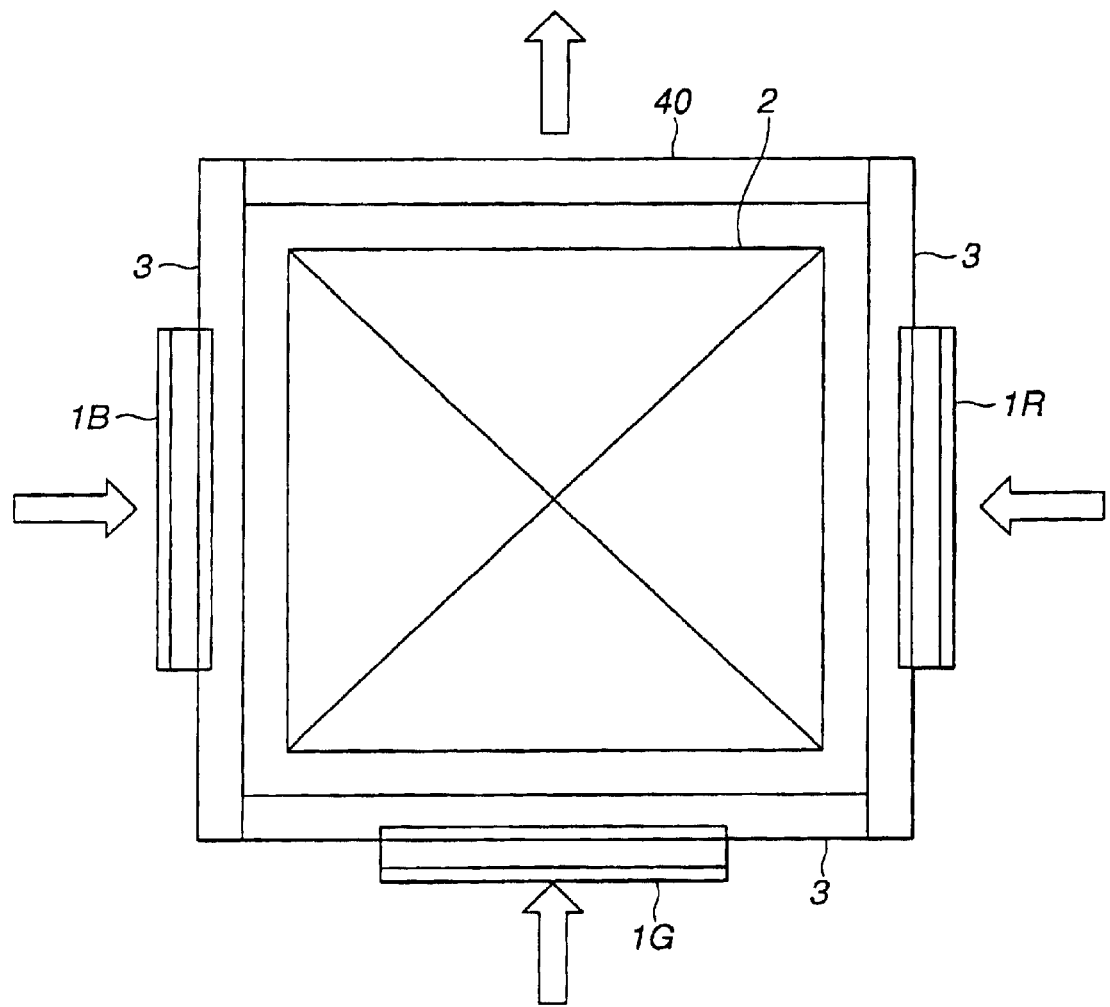
FIG. 6 shows a schematic plan view of another example of an optical prism unit of the liquid crystal projector employing the present invention.

FIG. 6 shows another example of the optical prism unit shown in FIG. 5. In the example shown in FIG. 6, instead of the packings 30 for enclosing a space, a dummy glass sheet 40 is arranged at the side of the emergent surface of the dichroic prism 2. The dummy glass sheet 40 is joined to the adjacent hold plates 3, and four surfaces of the dichroic prism 2 are completely sealed. Also, the top and the bottom of the dichroic prism 2 are completely sealed by the upper plate 4 and the lower plate 5. Thus, the air gap provided between the dichroic prism 2 and the respective liquid crystal panels 1R, 1G, and 1B can be completely sealed.

Figure 7:
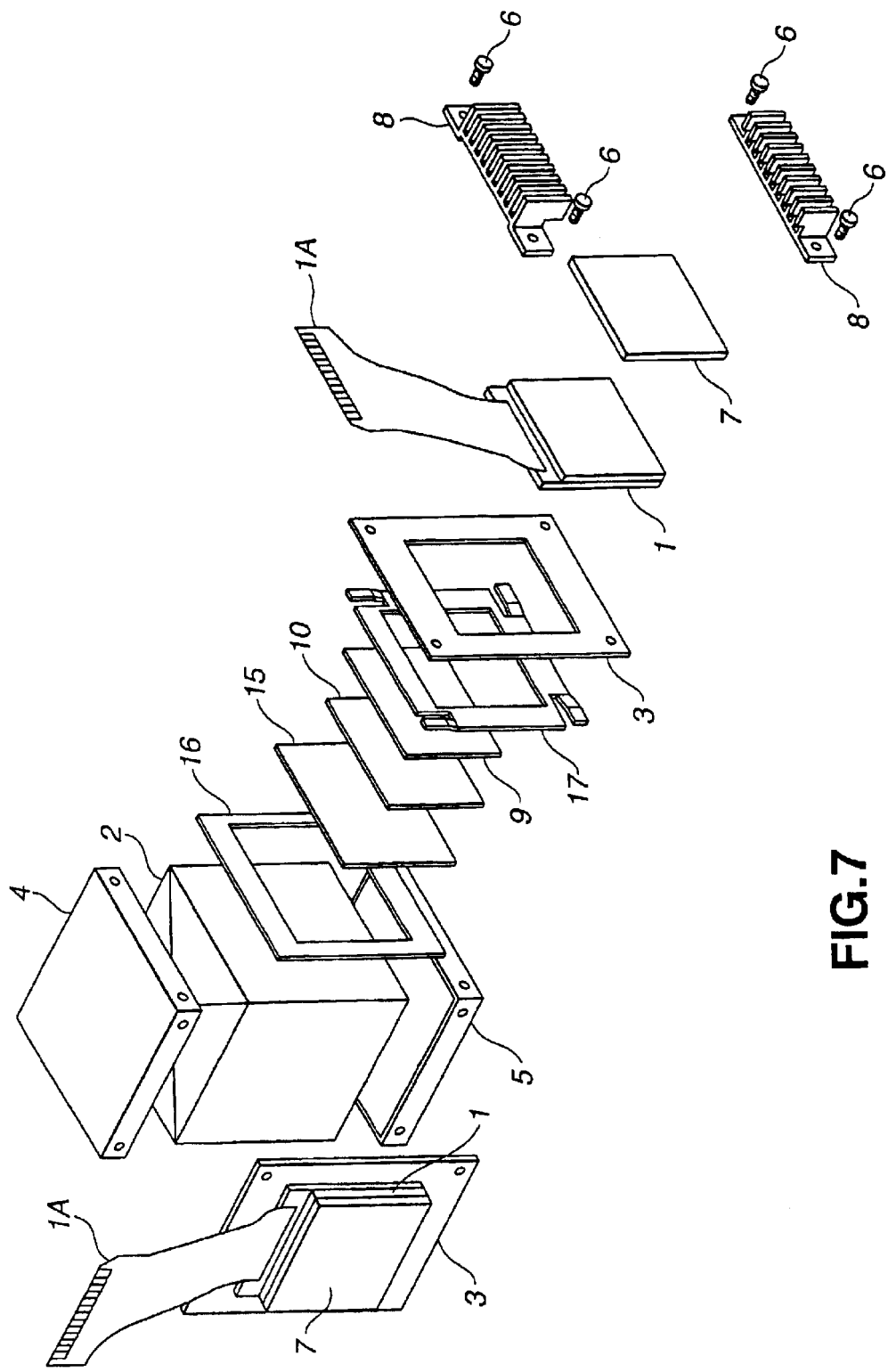
FIG. 7 shows an exploded view of another example of an optical prism unit configuring the principal portion of the liquid crystal projector employing the present invention.

FIG. 7 shows an exploded view of another example of an optical prism unit configuring the principal portion of the liquid crystal projector employing the present invention, and parts or components similar to those of the liquid crystal projector shown in FIG. 1 are indicated with the same reference numerals. The point different from that of the liquid crystal projector shown in FIG. 1 is that the phase difference plate 10 and the polarizing plate 9 are fixed not to the liquid crystal panel 1 but to a transparent glass sheet 15 made of such as sapphire glass having high thermal conductivity, and the glass sheet 15 is adhered to be fixed to the incident surface of the dichroic prism 2. Furthermore, a plate spring 17 and a spring bracket 16 are used so as to efficiently conduct heat generated from the glass sheet 15.

Figure 8:
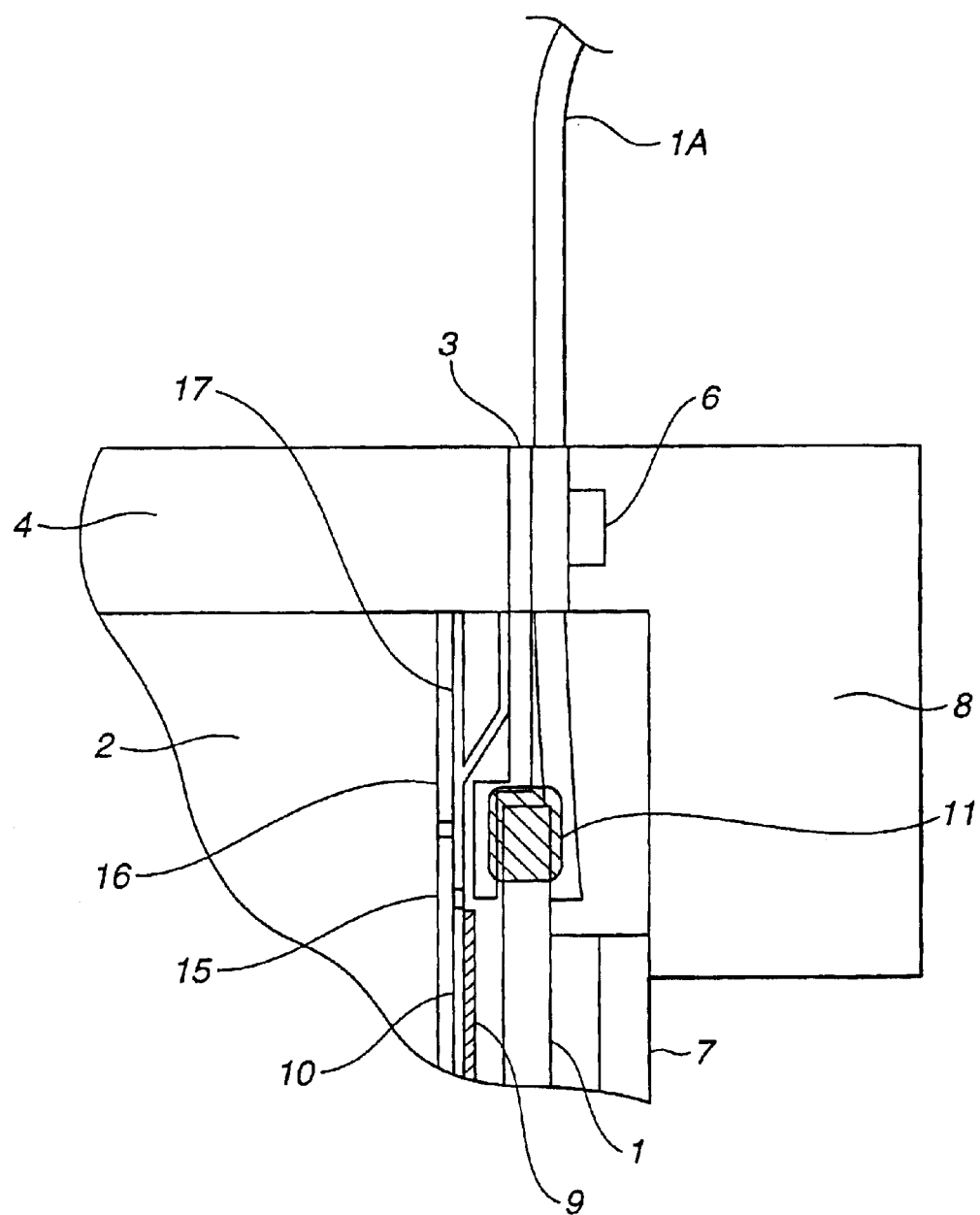
FIG. 8 shows an enlarged sectional view of the optical prism unit of the liquid crystal projector shown in FIG. 7.

FIG. 8 shows an enlarged sectional view of the optical prism unit of the liquid crystal projector shown in FIG. 7, which schematically shows fixing configuration of the liquid crystal panel 1. Parts or components similar to those of the liquid crystal projector shown in FIG. 2 are indicated with the same reference numerals.

The polarizing plate 9 and the phase difference plate 10 are fixed to the glass sheet 15, as shown in FIG. 8. The glass sheet 15 is adhered to be fixed to the incident surface of the dichroic prism 2. The plate spring 17 abuts on the glass sheet 15. Spring portions of the plate spring 17 are sandwiched between the incident surface of the dichroic prism 2 and the metal hold plate 3. The spring bracket 16 is arranged so as to support the plate spring 17. Thus, heat absorbed by the polarizing plate 9 is efficiently radiated to outside via the plate spring 17 and the spring bracket 16.

Figure 9:
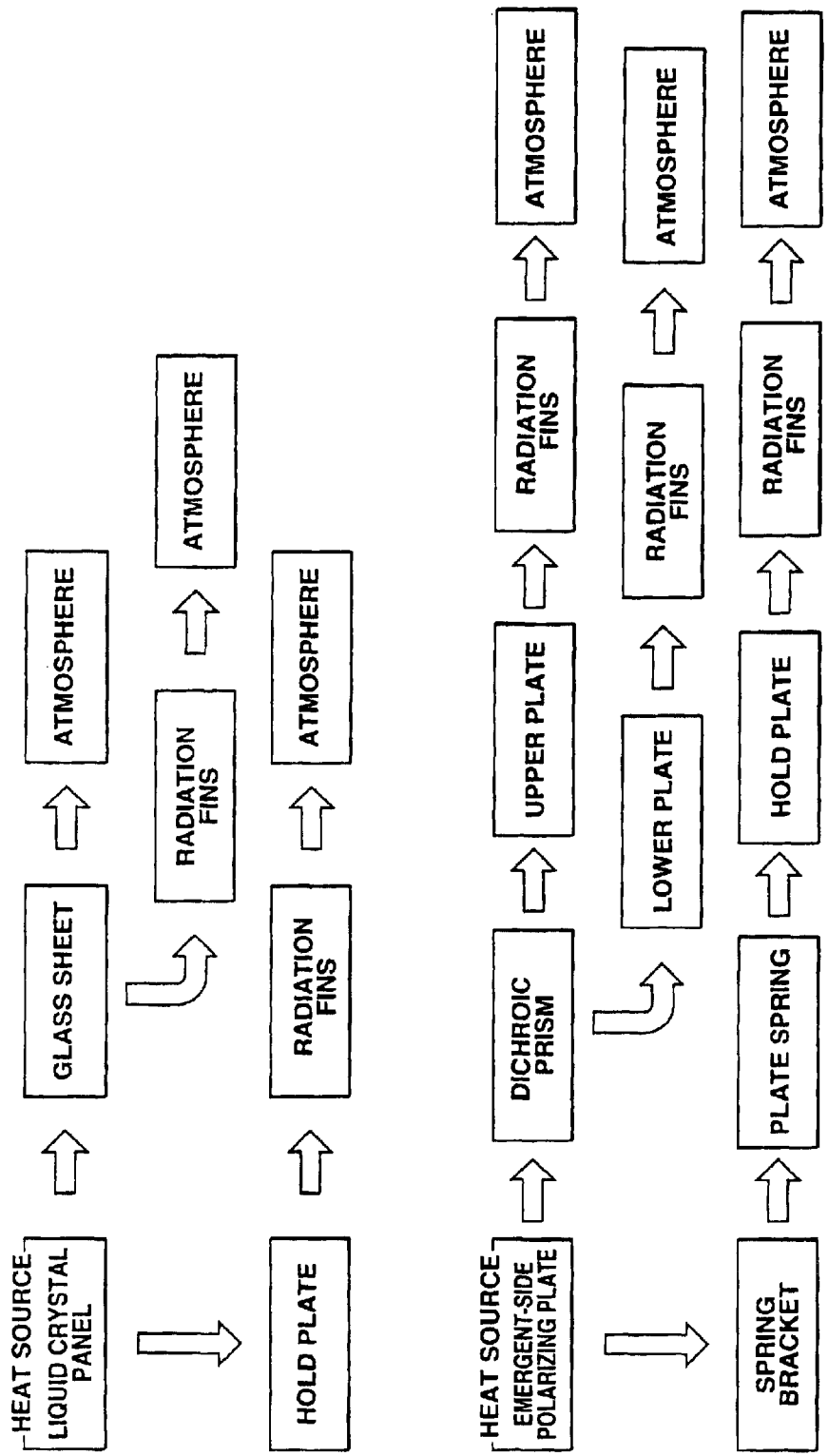
FIG. 9 shows a block diagram indicating radiation paths for radiating heat in the configuration of the liquid crystal projector shown in FIG. 7.

FIG. 9 shows a block diagram indicating radiation paths for radiating heat in the configuration shown in FIG. 7 and FIG. 8. Radiation blocks similar to those shown in FIG. 3 are indicated with the same blocks.

As has been described above, the liquid crystal panel and the emergent-side polarizing plate are the main heat sources of the liquid crystal projector. Heat generated from the liquid crystal panel is directly radiated into the atmosphere via the glass sheet which is fixed to the incident surface thereof. Otherwise, heat conducted to the glass sheet is further conducted to radiation fins, and thus conducted heat is radiated into the atmosphere from the radiation fins. Furthermore, heat generated from the liquid crystal panel is conducted to the metal hold plate, and thus conducted heat is radiated into the atmosphere from the radiation fins. These radiation paths for radiating heat are similar to those shown in FIG. 3. In the present embodiment, the emergent-side polarizing plate is separated from the liquid crystal panel to form other radiation paths. Firstly, heat generated from the emergent-side polarizing plate is conducted to the dichroic prism via the glass sheet having thermal conductivity, and thus conducted heat is radiated into the atmosphere from the upper plate via the radiation fins or from the lower plate via the radiation fins. Furthermore, heat generated from the emergent-side polarizing plate is conducted to the spring bracket and then to the plate spring, and is further conducted to the metal hold plate, and thus conducted heat is radiated into the atmosphere from the radiation fins. In this configuration, heat generated from the liquid crystal panel and the emergent-side polarizing plate is radiated into the atmosphere through mainly two radiation paths, which can further improve cooling capability. Thus, even though the liquid crystal panel is miniaturized and heating value is increased, the liquid crystal projector of this configuration can cope with the situation. Since rotational frequency of a cooling fan can be decreased, the problem of noise of the cooing fan can be solved when household liquid crystal projectors are diffused.

In this configuration, the emergent surface of the liquid crystal panel and the emergent-side polarizing plate are enclosed by the hold plate. Thus, cooling air from the cooling fan does not flow directly to the liquid crystal panel and to the emergent-side polarizing plate, which can prevent dust from sticking to the liquid crystal panel and to the emergent-side polarizing plate. Furthermore, it is possible to replace single liquid crystal panel after assembling the optical prism unit.

In the above-described embodiments, the radiation fins for each liquid crystal panel, which are separated or com-posed of an upper fin and a lower fin, may be united into one. On the other hand, the radiation fins may be of different configuration. For example, slits of the radiation fins, which are formed along the longitudinal direction in the embodiments, may be formed along the oblique direction so as to use cooling air efficiently. Moreover, protrusion lengths of the upper fin and the lower fin may be different. Furthermore, a parting plate may be arranged at the incident side or at the emergent side so as to improve optical properties.

INDUSTRIAL APPLICABILITY

As in the above, according to the present invention, since rotational frequency of a cooling fan can be decreased, a liquid crystal projector with suppressed fan noise can be provided. Since temperature of liquid crystal panels and emergent-side polarizing plates can be kept low, credibility and commercial value of a liquid crystal projector can be improved. An optical prism unit is not required to have adjustment mechanisms united therein, which can miniaturize a liquid crystal projector. Even though liquid crystal panels are miniaturized and heating value is increased, a liquid crystal projector can cope with the situation. Since rotational frequency of a cooling fan can be decreased, the problem of noise of the cooing fan can be solved when household liquid crystal projectors are diffused. Protection frames or enclosures made of resin fixed to conventional liquid crystal panels can be excluded, which can reduce the cost. Glass sheets have cooling function as well as dust proofing function, which can reduce the cost. Also, since an air gap is provided between a prism and liquid crystal panels, and the liquid crystal panels are not adhered to the prism, air bubbles are prevented from occurring between the liquid crystal panels and the prism, which can improve image quality.

What is claimed is:

1. A liquid crystal projector, comprising:
   a plurality of liquid crystal panels each of which provides a color output;
   a prism for compositing the color output lights to generate a color image; and
   metal plates disposed on sides of the prism; and
   an optical system for magnifying and projecting the generated color image;
   wherein
   the liquid crystal panels are each respectively directly adhered to a corresponding metal hold plates, and
   the metal hold plates are fixed to the metal plates such that the emergent surfaces of the liquid crystal panels face the incident surfaces of the prism.

2. The liquid crystal projector as set forth in claim 1, wherein the liquid crystal panels have thermally conductive glass sheets fixed over incident surfaces thereof.

3. The liquid crystal projector as set forth in claim 2, wherein radiation fins are fixed to the prism via the metal hold plates.

4. The liquid crystal projector as set forth in claim 1, wherein a sealed closed space is provided between the incident surfaces of the prism and the emergent surfaces of the liquid crystal panels, and at least one polarizing plate is arranged in the closed space.

5. The liquid crystal projector as set forth in claim 4, wherein polarizing plates are arranged at incident sides of the prism, and thermal conduction members for absorbing heat generated in the polarizing plates are arranged in the closed space provided between the incident surfaces of the prism and the emergent surfaces of the liquid crystal panels.

* * * * *